United States Patent Office 2,730,559
Patented Jan. 10, 1956

2,730,559
PREPARATION OF DIALLYLIC COMPOUNDS

Lee M. Porter, Concord, and Frederick F. Rust, Orinda, Calif., assignors to Shell Development Company, Emeryville, Calif., a corporation of Delaware No Drawing. Application April 27, 1953,
Serial No. 351,484

14 Claims. (Cl. 260—680)

This invention relates to a new process for preparing polyunsaturated organic compounds. More particularly, the invention relates to a process for preparing diallylic compounds by pyrolyzing a polyhalogenated compound in the presence of an allylic hydrocarbon.

Specifically, the invention provides a new and efficient non-catalytic process for preparing diallylic compounds having the structure

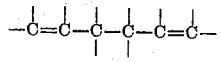

which comprises pyrolyzing a polyhalogenated compound at a temperature above about 400° C. for a short period in the presence of an excess of a mono-allylic hydrocarbon, such as propylene, and then recovering the desired diallylic compound from the resulting mixture.

As a special embodiment, the invention provides a new method for preparing diallyl or dimethallyl from propylene or isobutylene and a polychlorinated aliphatic compound which comprises pyrolyzing the polychlorinated aliphatic compound in the presence of the propylene or isobutylene at a temperature above about 400° C., and preferably between 400° C. and 600° C. for a few seconds, and then recovering the desired diallyl or dimethallyl from the resulting mixture.

Diallylic compounds, such as diallyl and dimethallyl, are used in industry for the preparation of fibers and films and in the manufacture of various insecticides and fungicides. Various methods have been suggested for preparing these compounds in the past, but they have all possessed various defects, particularly for large-scale operations. Many of the diallylic compounds have been prepared, for example, by reacting an allylic halide with a metal, such as sodium. This method is generally undesirable as it involves the use of expensive reactants and in many cases gives low yield of product. Many of the diallylic compounds have also been prepared by dehydrohalogenating the corresponding dihalogenated compound. This method leaves much to be desired as the dihalogenated compounds are in general difficult to prepare and special catalysts and reaction conditions are required for the dehydrohalogenation step.

It is an object of the invention, therefore, to provide a new and improved method for preparing diallylic compounds. It is a further object to provide a new non-catalytic method for preparing diallylic compounds from allylic hydrocarbons and polyhalogenated organic compounds. It is a further object to provide a practical and efficient method for coupling two allylic radicals together to form diallylic compounds. It is a further object to provide an efficient method for preparing diallyl from propylene and polyhalogenated compounds. It is a further object to provide a method for preparing diallyl from propylene and polyhalogenated compounds without the use of special catalysts. It is a further object to provide an efficient method for preparing diallylic compounds which yields in addition to the diallylic compounds a variety of valuable by-products. It is a further object to provide a method for preparing diallyl from propylene and carbon tetrachloride which yields the diallyl and chloroform. Other objects and advantages of the invention will be apparent from the following detailed description thereof.

It has now been discovered that these and other objects may be accomplished by pyrolyzing a polyhalogenated compound at a temperature above about 400° C. for a short period in the presence of an excess of an allylic hydrocarbon and then recovering the desired diallylic compound from the resulting mixture.

The process of the invention is based on the unexpected discovery that when the pyrolysis of polyhalogenated compounds at temperatures above 400° C. is conducted in the presence of an allylic hydrocarbon such as propylene, the halogen atom released by the pyrolysis will abstract a hydrogen atom from that compound to yield an allylic radical and two of those allylic radicals will associate to form a diallylic compound. The mechanism of this reaction may be illustrated by the following equations showing the production of diallyl from carbon tetrachloride and propylene:

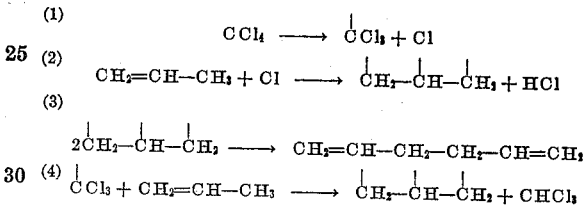

The carbon tetrachloride decomposes to carbon trichloride and a chlorine atom (Equation 1), the chlorine abstracts a hydrogen atom from propylene to yield an allyl radical (Equation 2), and then two allyl radicals combine to form the desired diallyl (Equation 3). As shown in Equation 4, the carbon trichloride may then react with the propylene to form an allyl radical and the by-product CHCl₃.

The process of the invention is thus a general method for preparing diallylic compounds. By merely varying the type of allylic hydrocarbon and the polyhalogenated compound, one can produce a great variety of different types of diallylic compounds, some of which have never been produced heretofore.

The process of the invention is also of advantage as it yields in many cases valuable by-products in addition to the desired diallylic compounds. The allylic radicals may, for example, condense to form aromatic compounds, such as benzene, or the free radical formed from the removal of the halogen atom from the polyhalogenated compound may be terminated by a hydrogen atom such as those removed from the allylic hydrocarbon (Equation 4 above) or by other free radicals to form halogenated by-products, such as chloroform, hexachlorocyclopentadiene and the like.

The polyhalogenated compounds used in the process of the invention are those compounds possessing at least two, and preferably two to eight, active halogen atoms, i. e., halogen atoms which may be removed when the compound is heated at the above-noted high temperatures. The compounds should, of course, be of such a nature that they release the halogen as a free atom rather than by the removal of a molecule of hydrogen halide from that compound. The polyhalogenated compounds may be inorganic or organic and may be saturated or unsaturated, aliphatic, aromatic or heterocyclic and may be substituted with non-interfering substituents, such as ether and ester radicals, and the like. Included within this group are, for example, thionyl chloride, phosphorus pentachloride, carbon tetrachloride, octachlorocyclopentene, hexachloropropylene, trichloroacetic acid, trichloropropane, and the like. Mixtures of these compounds may also be utilized in the process.

The polyhalogenated compounds which are preferably used in the process are the polychlorinated alkanes, alkenes, and cycloalkenes containing no more than 12 carbon atoms and having from 3 to 8 chlorine atoms, such as, for example, carbon tetrachloride, trichloropropane, octachlorocyclopentene, hexachloropropene, and the like.

According to the process of the invention, the above-described polyhalogenated compounds are combined with the desired allylic hydrocarbons. The expression "allylic hydrocarbon" as used throughout the specification and claims refers to those hydrocarbons which possess a double bond between two aliphatic carbon atoms one of which is joined to an aliphatic carbon atom bearing a labile hydrogen atom. Examples of suitable allylic hydrocarbons include, among others, propylene, isobutylene, 2-phenyl-2-propene, 2-methyl-2-butene, 3-phenyl-1-propene, and the like.

Preferred allylic hydrocarbons to be used in the process of the invention are those of the formula

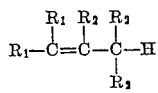

wherein $R_1$ is a member of the group consisting of hydrogen, tertiary alkyl radicals, aryl and aralkyl radicals, and $R_2$ is a member of the group consisting of hydrogen, alkyl, aryl and aralkyl radicals, such as propylene, isobutylene, 3-phenyl-1-propene, 2,4,4-trimethyl-2-pentene, 2-methyl-2-butene, and 1-xylyl-2-propene.

Preferred allylic hydrocarbons are those wherein the hydrogen atom shown in the above formula for the allylic compounds has a bond energy of less than 90 kg. calories, and preferably less than 85 kg. calories.

Allylic hydrocarbons, such as propylene and isobutylene, come under special consideration, particularly because of the ease of operation and fine yields of product obtained therewith.

The allylic hydrocarbons may be used alone or in admixture with each other or with other types of hydrocarbons. In the case of the olefins, such as propylene and isobutylene, it may be desirable to utilize hydrocarbon fractions containing these particular compounds as well as other $C_3$ and $C_4$ hydrocarbons.

The desired product of the process of the invention comprises the diallylic compounds. The expression "diallylic compounds" as used herein and in the appended claims refers to compounds having the structure

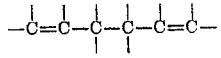

which are formed by the combination of two of the aforedescribed allylic radicals. The components attached to the free bonds of this formula of the diallylic compounds will be the $R_1$ and $R_2$ of the above-described formula for the allylic hydrocarbons. Examples of the diallylic compounds produced by the process of the invention include among others, diallyl, dimethallyl, 2-methyl-1,5-hexadiene, 2-butyl-1,5-hexadiene and 2,5-diethyl-1,5-hexadiene.

In the operation of the process of the invention, the allylic hydrocarbon and the polyhalogenated compound may be premixed before they are added to the reaction zone or they may be added separately. If the components are added separately, one or both of the reactants may be added at a plurality of points throughout the reaction zone or they may be added at the same place in the reaction zone. To insure a thorough intimate mixing of the components, it is generally desirable to premix the components before introducing them into the reaction zone. It is also advantageous in most instances to preheat the components, either separately or in admixture, to a temperature about 40° C. to 100° C. below the operating temperature before they are added to the reaction zone.

The components should be added so as to have the allylic hydrocarbon in excess of the polyhalogenated compound and preferably in a molar excess of at least 3 to 1. For best results, the allylic hydrocarbon and polyhalogenated compound are combined in molar ratios varying from 12:1 to 4:1, and more preferably from 8:1 to 5:1.

The temperature used in the reaction zone should be above about 400° C. and, in general, below about 750° C. The exact temperatures employed in each case are preferably adjusted to the nature of the polyhalogenated compound, residence period, etc. For the polychlorinated aliphatic compounds, preferred temperatures generally range from about 400° C. to 600° C. and more preferably from 540° C. to 600° C. Polychlorinated inorganic compounds, such as $SOCl_2$ and $PCl_5$, are preferably employed at temperatures between 450° C. and 600° C.

Atmospheric, superatmospheric or subatmospheric pressures may be used as desired. While the use of superatmospheric pressures may be desirable in some instances, the process is more conveniently executed at or near atmospheric pressure.

The residence period for the reaction will depend on the desired degree of decomposition of the polyhalogenated compounds and this in turn will depend on the temperature selected and the nature of the polyhalogenated compound. The results are generally better when only an intermediate portion, say from 15% to 50%, and more preferably from 20% to 40% of the polyhalogenated compound is decomposed per pass, and the conditions are generally adjusted to effect this type of conversion. At temperatures ranging from 400° C. to 750° C., the desired decomposition per pass is generally obtained in residence periods ranging from 1 second to 50 seconds. For the polychlorinated aliphatic compounds, at temperatures ranging from 450° C. to 550° C., the desired decomposition per pass is generally obtained in from 20 to 40 seconds, and at the higher temperatures, e. g., from 550° C. to 750° C., the desired decomposition is generally obtained in from 1 to 30 seconds.

The mixture withdrawn from the reaction zone is cooled, condensed and scrubbed or otherwise treated to remove the hydrogen chloride formed in the reaction zone. The desired diallylic compound or compounds may then be recovered by any suitable means, such as fractional distillation, extraction, and the like. In addition to the desired diallylic compound, the reaction mixture will also contain quantities of by-products derived from the allylic radicals as well as the free radical obtained from the polyhalogenated compound. These by-products may also be conveniently recovered by any of the conventional methods, such as distillation and the like.

The apparatus used in the above-described process may be of any suitable construction as long as it provides means for introducing the reactants, means for maintaining the desired temperature and means for condensing the reaction mixture and recovering the desired product. The reaction tube should be fabricated from materials capable of withstanding vapors of the halogen acids and the high temperatures employed in the pyrolysis of the polyhalogenated compounds. Reaction tubes of glass, steel, etc., are especially suitable.

To illustrate the manner in which the invention may be carried out, the following examples are given. It is to be understood, however, that the examples are for the purpose of illustration and the invention is not to be regarded as limited to any of the specific conditions or reactants cited therein.

Example I

The apparatus used in this experiment comprised a cylindrical glass reaction tube having a thermal well down the center. The tube had a length of about 30 cm. and a volume of about 700 cc. Around the tube was an electrical furnace that contained separate heating units around the upper, middle and bottom portions of the tube. A small spiral preheat glass tube was joined to the top of the reaction tube and the bottom of the tube was joined to a water-cooled condenser which in turn was joined to a water trap for removing HCl and a Dry Ice trap for condensing the organic material.

Hexachloropropylene and propylene were mixed in a ratio of 1:7 and the mixture passed into the glass preheat tube and then into the glass reaction tube which was kept at a temperature of 400° C. The residence period in the reaction tube was 33 seconds. The effluent vapors were removed at the bottom, cooled, and the hydrogen chloride removed in the water trap. The organic material that was collected in the Dry Ice trap was distilled to remove propylene, hexachloropropylene, the desired diallyl and a fraction containing benzene.

Dimethallyl may be prepared according to the above-described process by replacing the propylene with isobutylene.

Example II

This example illustrates the preparation of diallyl by pyrolyzing carbon tetrachloride in the presence of propylene. The apparatus used was the same as that described in Example I.

Carbon tetrachloride and propylene were combined in a ratio of 1:4 and the mixture passed into the glass reaction tube which was maintained at 575° C. The residence period was 10 seconds. The effluent vapors were removed at the bottom, cooled, and the hydrogen chloride removed in the water trap. The organic material that was collected in the Dry Ice trap was distilled to remove propylene from the desired diallyl and chloroform.

Example III

This example illustrates the preparation of diallyl by pyrolyzing thionyl chloride in the presence of propylene. The apparatus used in this experiment is the same as that described in Example I.

Thionyl chloride and propylene were mixed in a ratio of 1:5 and introduced into the glass preheat tube and the mixture then passed into the glass reaction tube which was maintained at 500° C. The residence period was about 17 seconds. The effluent vapors were removed at the bottom, cooled, and the hydrogen chloride removed at the water trap. The organic material that was collected in the Dry Ice trap was distilled to recover the desired diallyl. A small quantity of benzene was also recovered.

Example IV

This example illustrates the preparation of diallyl from hexachlorocyclopentenone and propylene. The apparatus used in this experiment was the same as that described in Example I.

Hexachlorocyclopentenone and propylene were mixed in a ratio of 1:4 and passed into the glass reaction tube which was maintained at 400° C. The residence period in the reaction tube was about 32 seconds. The effluent vapors were moved at the bottom, cooled, and the hydrogen chloride removed in the water trap. The organic material that was collected in the Dry Ice trap was then distilled to remove the desired diallyl.

Example V

This example illustrates the preparation of diallyl by pyrolyzing octachlorocyclopentene in the presence of propylene. The apparatus used in this experiment was the same as that described in Example I.

Octachlorocyclopentene and propylene were mixed in a ratio of 1:4 and passed into the glass reaction tube which was kept at 400° C. The residence period was 30 seconds. The effluent vapors were removed at the bottom, cooled, and the hydrogen chloride removed at the water trap. The collected organic material was then distilled to remove the desired diallyl. Analysis indicated there had been a 15% conversion and 12% yield of diallyl. Hexachlorocyclopentadiene is recovered as a by-product.

Dimethallyl is prepared by the above-described process by replacing the propylene with isobutylene.

We claim as our invention:

1. A process for preparing a diallylic compound which comprises pyrolyzing a polyhalogenated compound which is incapable of splitting out hydrogen halide under the conditions of the process at a temperature above about 400° C. for a short period in the presence of an excess of an allylic hydrocarbon and then recovering the desired diallylic compound from the reaction mixture.

2. The process as defined in claim 1 wherein the temperature varies from 400° C. to 600° C. and the residence period varies from 1 to 30 seconds.

3. The process as defined in claim 1 wherein the polyhalogenated compound is thionyl chloride.

4. The process as defined in claim 1 wherein the allylic hydrocarbon is propylene.

5. A process for preparing a diallylic compound which comprises heating a polychlorinated alkane which is incapable of splitting out hydrogen halide under the conditions of the process to a pyrolyzing temperature between 400° C. and 600° C. for a short period in the presence of a beta,gamma-monoethylenically unsaturated aliphatic hydrocarbon, said polychlorinated compound and unsaturated aliphatic hydrocarbon being combined in a mole ratio of 1:4 to 1:12, and then recovering the desired diallylic compound from the resulting mixture.

6. A process for preparing a diallylic compound which comprises heating a polychlorinated aliphatic hydrocarbon having from 3 to 8 chlorine atoms and from 2 to 12 carbon atoms and is incapable of splitting out hydrogen halide under the conditions of the process at a pyrolyzing temperature above 400° C. for a short period in the presence of an excess of a 2-alkene and then recovering the said diallylic compound from the reaction mixture.

7. A process as defined in claim 6 wherein the polychlorinated compound and the 2-alkene are combined in a molar ratio of 1:4 to 1:12.

8. A process as defined in claim 6 wherein the temperature employed varies from 400° C. to 600° C. and the residence time is from 5 to 20 seconds.

9. A process as defined in claim 6 wherein the polychlorinated compound is octachlorocyclopentene.

10. A process for preparing a diallylic compound made up by joining two 2-alkenyl free radicals which comprises heating a polychlorinated alkane which is incapable of splitting out hydrogen halide under the conditions of the process at a pyrolyzing temperature between 400° C. and 600° C. for a brief period in the presence of a 2-alkene having a replaceable hydrogen atom the bond energy of which is less than 90 kg. calories, the said polychlorinated alkane and 2-alkene being combined in the mole ratio of 1:4 to 1:8, and then recovering the desired diallylic compound from the resulting mixture.

11. A process as in claim 10 wherein the polychlorinated alkane is carbon tetrachloride and the 2-alkene is propylene.

12. A process as in claim 10 wherein the polychlorinated alkane is carbon tetrachloride and the 2-alkene is isobutylene.

13. A process as in claim 10 wherein the polychlorinated alkane is hexachloropropane and the 2-alkene is propylene.

14. A process for preparing diallyl which comprises heating carbon tetrachloride in the presence of propylene in a molar ratio of 1:4 to 1:8 at a temperature between 500° C. and 600° C. for a residence period from 1 to 30 seconds, and then recovering diallyl.

References Cited in the file of this patent

UNITED STATES PATENTS

| | | |
|---|---|---|
| 2,370,513 | Amos et al. | Feb. 27, 1945 |
| 2,402,034 | Folkins et al. | June 11, 1946 |